United States Patent [19]

Arnold et al.

[11] Patent Number: 4,960,854
[45] Date of Patent: Oct. 2, 1990

[54] RIGID ROD AROMATIC BENZTHIAZOLE/OXAZOLE HETEROCYCLIC POLYMER

[75] Inventors: Fred E. Arnold, Centerville; Jerry L. Burkett, Troy, both of Ohio

[73] Assignee: The United States of America as represented by the Secretary of the Air Force, Washington, D.C.

[21] Appl. No.: 411,769

[22] Filed: Sep. 25, 1989

Related U.S. Application Data

[62] Division of Ser. No. 227,977, Jul. 29, 1988, Pat. No. 4,900,805.

[51] Int. Cl.$^5$ .............................................. C08G 75/32
[52] U.S. Cl. ..................................... 528/183; 528/176; 528/179; 528/184; 528/337; 528/342; 528/348
[58] Field of Search ............... 528/183, 176, 184, 179, 528/337, 342, 348

[56] References Cited

U.S. PATENT DOCUMENTS

| 4,108,835 | 8/1978 | Arnold et al. | 528/183 |
| 4,131,748 | 12/1978 | Arnold et al. | 562/488 |
| 4,533,692 | 8/1985 | Wolfe et al. | 524/417 |
| 4,533,693 | 8/1985 | Wolfe et al. | 524/417 |
| 4,900,805 | 2/1990 | Arnold et al. | 528/337 |

Primary Examiner—Harold D. Anderson
Attorney, Agent, or Firm—Charles E. Bricker; Donald J. Singer

[57] ABSTRACT

There are provided aromatic heterocyclic polymers having repeating units of the formula

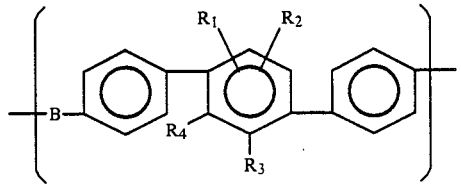

wherein $R_1$ is —H or

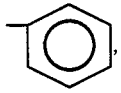

$R_2$ is

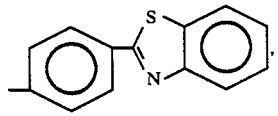

$R_3$ is

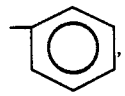

and $R_4$ is $R_2$ or

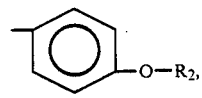

and B is

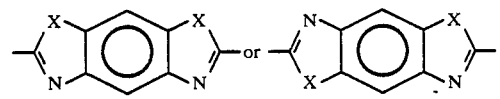

wherein X is —S—, —O—, or —NH—.

11 Claims, No Drawings

RIGID ROD AROMATIC BENZTHIAZOLE/OXAZOLE HETEROCYCLIC POLYMER

RIGHTS OF THE GOVERNMENT

The invention described herein may be manufactured and used by or for the Government of the United States for all governmental purposes without the payment of any royalty.

This is a division of application Ser. No. 227,977, filed July 29, 1988, now U.S. Pat. No. 4,900,805.

BACKGROUND OF THE INVENTION

This invention relates to high molecular weight benzobisazole polymers containing pendent benzthiazole groups.

In general, the class of aromatic heterocyclic extended chain polymers are well known for their outstanding thermal, physical and chemical properties. These polymers generally exhibit excellent modulus and tenacity properties, but lack good properties when in compression which limits their use as reinforcing structural fibers.

It is an object of the present invention to provide aromatic heterocyclic polymers which exhibit improved compressive properties Other objects, aspects and advantages of the present invention will be apparent to those skilled in the art from a reading of the following detailed disclosure of the invention.

SUMMARY OF THE INVENTION

In accordance with the present invention there are provided polymers having repeating units of the formula

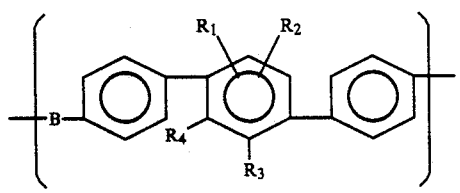

wherein $R_1$ is —H or

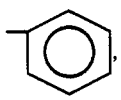

$R_2$ is

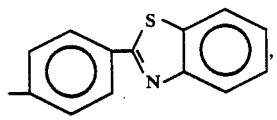

$R_3$ is and $R_4$ is $R_2$ or

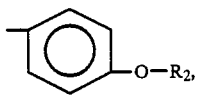

and B is

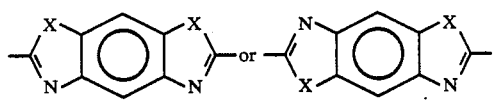

wherein X is —S—, —O— or —NH—.

DESCRIPTION OF THE PREFERRED EMBODIMENTS

The polymers of this invention are prepared by the polycondensation of 4,6-diaminoresorcinol dihydrochloride, 2,5-diaminohydroquinone dihydrochloride, 4,6-diamino-1,3-benzenedlthiol dihydrochloride, 2,5-diamino-1,4-benzenedithiol dihydrochloride or 1,2,4,5-tetraaminobenzene tetrahydrochloride and a phenylbenzthiazole-substituted p-terphenylene dicarboxylic acid of the formula

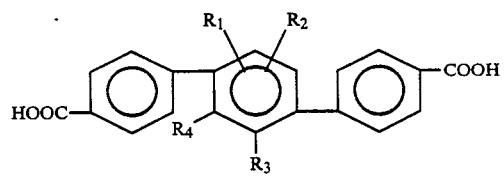

wherein $R_1$ is —H or

$R_2$ is

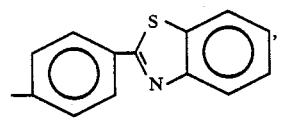

$R_3$ is

and $R_4$ is $R_2$ or

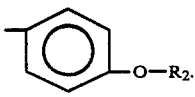

Preparation of the phenylbenzthiazole-substituted p-terphenylene dicarboxylic acid is described in our co-pending application Ser. No. 227,978, filed July 29, 1988, now U.S. Pat. No. 4,892,953.

In conducting the process, the amino hydrochloride monomer may be mixed with polyphosphoric acid (PPA) then heated, under vacuum or an inert gas atmosphere to about 70° to 130° C. over a period of about 3 to 24 hours, do dehydrochlorinate the amino monomer. At the end of this period, the dicarboxylic acid is added. An additional amount of phosphorous pentoxide and/or PPA may be added as required to provide a stirrable mixture. Alternatively, the amino hydrochloride and dicarboxylic acid monomers may be mixed with polyphosphoric acid then heated, under vacuum or an inert gas atmosphere to about 70° to 130° C. over a period of about 3 to 24 hours, do dehydrochlorinate the amino monomer. Equimolar amounts of the amino and dicarboxylic acid monomers are generally used. The amount of PPA used is that which is sufficient to provide a stirrable mixture. In general, the concentration of monomers in the acid ranges from about 0.5 to 12.0 percent.

Following dehydrochlorination, the reaction mixture is heated at a temperature in the range of about 75° to 225° C. for a period ranging from 24 to 96 hours. Preferably the polymerization is carried out in stages, i.e. a step-wise heating schedule is employed. Step-wise heating is preferred because immediately exposing the reaction mixture to relatively high polymerization temperatures may cause decomposition of the monomers. The selection of a particular step-wise heating schedule is obvious to one of ordinary skill in the art. At the end of the reaction period, the polymer solution is in a very viscous or semi-solid state. After cooling, the product is washed repeatedly with water while stirring, after which it is dried under a high vacuum at an elevated temperature The molecular weight of these polymers is commonly indicated by the inherent viscosity of the polymer. The inherent viscosity is commonly determined at a concentration of 0.2 weight/volume percent in methanesulfonic acid at 30° C.

The polymers produced in accordance with the process of the present invention may be used to produce fibers and sheets. In order to form these polymers into fibers or sheets, dopes are prepared containing about 5 to 15 weight percent of the polymer in a strong acid, such a sulfuric acid, methanesulfonic acid, chlorosulfuric acid, and the like, including mixtures thereof. Such dopes may be spun or extruded into a coagulation bath comprising water or a water/methanesulfonic acid mixture.

The following examples illustrate the invention:

EXAMPLE I

The monomers 4,4″-dicarboxy-2′5′-diphenyl-3′,6′-[2-(4-phenylbenzthiazole)]-p-terphenyl (0.8892 g, 1.0 mmol) and 2,5-diamino-1,4-benzenedithiol dihydrochloride (0.2452 g, 1.0 mmol) were placed in 97 g PPA (84% $P_2O_5$). Under a nitrogen atmosphere, the mixture was heated slowly to 90° C. to effect dehydrochlorination and then heated as follows: 105° C. for 2 h; 150° C. for 19 H; and 190° C. for 24 h. The polymer was precipitated into water, washed with ammonium hydroxide, methanol and hexane. The air-dried polymer was further dried under reduced pressure (0.02 mm) at 100° C. for 16 h. An intrinsic viscosity of 12 dL/g was measured in methanesulfonic acid at 30° C.

Analysis Calcd. for $C_{64}H_{36}N_4S_4$: C, 77 70; H, 3.67; N, 5.66. Found C, 75.88; H, 3.75; N, 5.52.

EXAMPLE II

The monomers 4,4″-dicarboxy-2′-phenyl-3′,6′-[2-(4-phenoxyphenyl)benzthiazole]-p-terphenyl (0.4524 g, 0.5 mmol) and 2,5-diamino-1,4-benzenedithiol dihydrochloride (0.1225 g, 0.5 mmol) were placed in 198 g PPA (84% $P_2O_5$). Under a nitrogen atmosphere, the mixture was heated slowly to 65° C. to effect dehydrochlorination and then heated as follows: 70° C. for 4 h, 150° C. for 24 h, and 175° C. for 1 h. The polymer was precipitated into water, washed with concentrated ammonium hydroxide, washed with water, methanol, methanol/benzene mixtures, and finally with benzene. The swollen polymer was then frozen and dried under reduced (0.02 mm) pressure to give 0.37 g (93.5%) of polymer: $[\eta]=11.7$ dL/g in methanesulfonic acid at 30° C.

Analysis Calcd. for $C_{64}H_{36}N_2S_4O$: C, 76.46; H, 3.61; N, 5.57. Found: C, 74.52; H, 3.54; N, 5.00.

EXAMPLE III

A mixture of 4,4″-dicaroxy-2′-phenyl-3′,6′-[2-(4-phenylbenzthiazole)]-p-terphenyl (3.2517 g. 4.0 mmol) 2,5-diamino-1,4-benzenedithio dihydrochloride (0.9802 g 4.0 mmol), and 24.98 g, PPA (77 percent $P_2O_5$) was placed in a resin flask equipped with a high torque mechanical stirrer, nitrogen/outlet, and a pressure regulator. Under a nitrogen flow, the flask was evacuated by means of a water aspirator pump. The monomers were incorporated into the PPA by stirring, and the resulting mixture was then dehydrochlorinated under reduced pressure (600 mm) by heating as follows: 25° C./4 hours; 60° C./h: 85° C./2 hours. To this mixture was added, under a nitrogen atmosphere 10.45 g of $P_2O_5$. The mixture was heated as additional 56 hours/85° C. The polymer was precipitated into water, washed repeatedly with water, methanol and dried under reduced prssure (0.02 mm) at 138° C. An intrinsic viscosity of 23.0 dL/g was measured in methanesulfonic acid at 30° C.

Analysis Calcd. for $C_{58}H_{32}N_4S_4$: C, 76.28; H, 3.53; N, 6.14. Found: C, 75.30; H, 3.15; N, 5.40.

EXAMPLE IV

The monomers 4,4″-dicarboxy-2′,5′-diphenyl-3′,6′-[2-(4-phenylbenzthiazole)]-p-terphenyl (0.4445 g, k0.5 mmol) and 4,5-diamino-1,3-benzenediol dihydrochloride (0.1065 g, 0.5 mmol) were placed in 100 g PPA (84% $P_2O_5$). Under a nitrogen atmosphere, the mixture was heated to 60° C. to effect dehydrochlorination (16 h) and then heated as follows 100° C. for 5 h, 150° C. for 16 h, 175° C. for 8 h, 180° C. for 16 h, and 190° C. for 2 h. The polymer was precipitated into water, washed with ammonium hydroxide, water, and methanol. The air-dried polymer was further dried under reduced pressure (0.02 mm) at 100° C. for 16 h. An intrinsic viscosity of 7.7 dL/g was measured in methanesulfonic acid at 30° C.

Analysis Calcd. for $C_{64}H_{36}N_4S_2O_2$:

C, 80.31; H, 3.79; N, 5.85.
C Found: C. 74.99; H, 3.76; N, 5.67.

EXAMPLE V

The monomers 4,4''-dicarboxy-2'-phenyl-3',6'-[2-4-phenoxyphenyl)benzthiazole]-p-terphenyl (o.4528 g, 0.5 mmol) and 4,6-diamino-1,3-benzenediol dihydrochloride (0 1066 g, 0.5 mmol) were placed in 198 g PPA (84% $P_2O_5$). The temperature was raised to 75° C. under a nitrogen atmosphere to effect dehydrochlorination of the amino monomer and then heated as follows: 150° C./18 h; 180° C./6.5 h. The polymer was precipitated into water, washed with concentrated ammonium hydroxide, water, and methanol. The air-dried polymer was further dried under reduced pressure (0.02 mm) at 100° C. for 16 h. An intrinsic viscosity of 8.44 dL/g was measured in methanesulfonic acid at 30° C.

Analysis Calcd. for $C_{64}H_{36}N_4S_2O_3$: C, 78.99; H, 3.73; N, 5.76. Found: C, 75.75; H, 3.79; N, 5.36.

Various modifications of the present invention can be made in view of the foregoing disclosure without departing from the spirit and scope of the invention.

We claim:

1. An aromatic heterocyclic polymer having repeating units of the formula

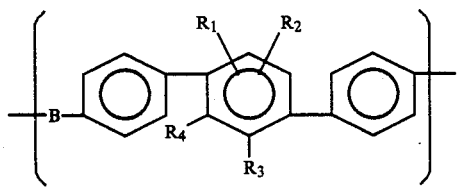

wherein $R_1$ is —H or

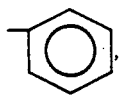

$R_2$ is

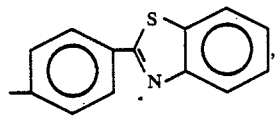

$R_3$ is

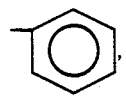

and $R_4$ is $R_2$ or

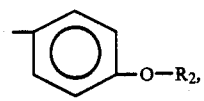

and B is

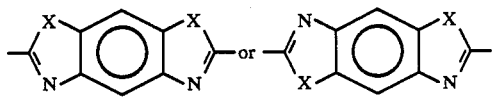

wherein X is —O—.

2. The polymer of claim 1 wherein B is

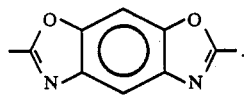

3. The polymer of claim 2 wherein $R_1$ is —H and $R_4$ is $R_2$.

4. The polymer of claim 2 wherein $R_1$ is —H and $R_4$ is

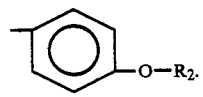

5. The polymer of claim 2 wherein $R_1$ is

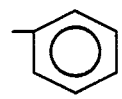

and $R_4$ is $R_2$.

6. The polymer of claim 2 wherein $R_1$ is

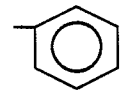

and $R_4$ is

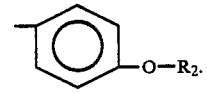

7. The polymer of claim 1 wherein B is

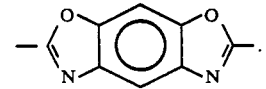

8. The polymer of claim 7 wherein $R_1$ is —H and $R_4$ is $R_2$.

9. The polymer of claim 7 wherein $R_1$ is —H and $R_4$ is

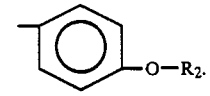

10. The polymer of claim 7 wherein $R_1$ is

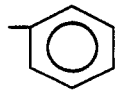
and R₄ is R₂.
11. The polymer of claim 7 wherein R₁ is
and R₄ is
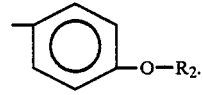
* * * * *